(12) United States Patent
Akavoor Sankaran

(10) Patent No.: US 10,897,591 B2
(45) Date of Patent: Jan. 19, 2021

(54) IMAGE SENSORS WITH TESTING CAPABILITIES

(71) Applicant: SEMICONDUCTOR COMPONENTS INDUSTRIES, LLC, Phoenix, AZ (US)

(72) Inventor: Thapan Akavoor Sankaran, Bangalore (IN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 130 days.

(21) Appl. No.: 16/189,145

(22) Filed: Nov. 13, 2018

(65) Prior Publication Data

US 2020/0154069 A1    May 14, 2020

(51) Int. Cl.
    *H04N 5/378*    (2011.01)
    *H04N 17/00*   (2006.01)
    *H04N 5/367*    (2011.01)

(52) U.S. Cl.
    CPC ............ *H04N 5/378* (2013.01); *H04N 5/367* (2013.01); *H04N 17/002* (2013.01)

(58) Field of Classification Search
    CPC ....................................................... H04N 5/378
    USPC ......................................................... 348/308
    See application file for complete search history.

(56) References Cited

U.S. PATENT DOCUMENTS

| 2012/0169909 | A1 | 7/2012 | Rysinski et al. |
| 2013/0293724 | A1 | 11/2013 | Martinussen |
| 2018/0035108 | A1* | 2/2018 | Chae ...................... H04N 5/378 |

* cited by examiner

*Primary Examiner* — Joel W Fosselman
(74) *Attorney, Agent, or Firm* — Treyz Law Group, P.C.; Joseph F. Guihan

(57) ABSTRACT

An image sensor may include an array of imaging pixels and readout circuitry. Testing circuitry may be interposed between the imaging pixels and the readout circuitry. The testing circuitry may include first and second test rows that provide first and second respective test voltages. In a testing mode, the first test voltage may be provided to approximately half of the readout circuitry and the second the second test voltage may be provided to the remaining half of the readout circuitry. In an imaging mode, the readout circuitry may be coupled to column output lines and read out signals from the array of imaging pixels. The components that receive different test voltages may be arranged in an alternating or checkerboard pattern to ensure testing of scenarios with coupling between adjacent components.

19 Claims, 10 Drawing Sheets

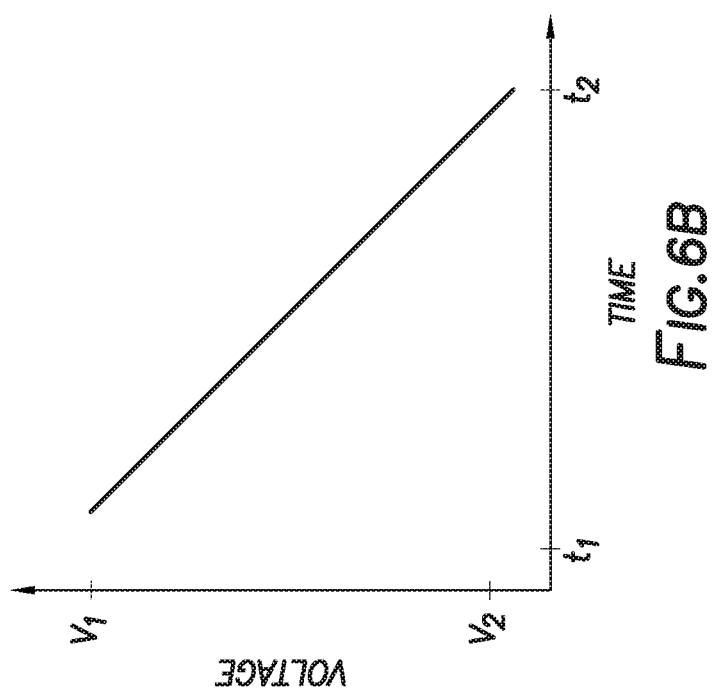
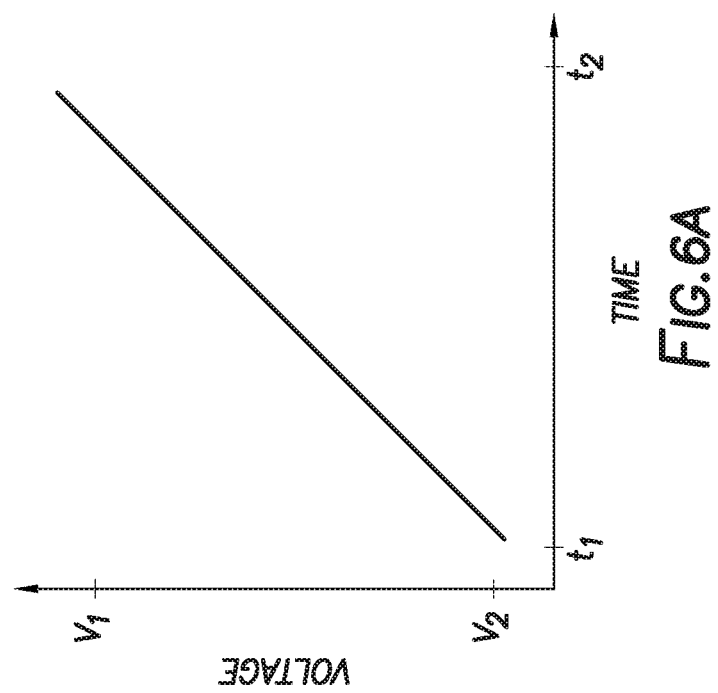
FIG. 6B
FIG. 6A

IMAGE SENSORS WITH TESTING CAPABILITIES

BACKGROUND

This relates generally to image sensors and, more particularly, to image sensors having testing capabilities.

Image sensors are commonly used in electronic devices such as cellular telephones, cameras, and computers to capture images. In a typical arrangement, an electronic device is provided with an array of image pixels arranged in pixel rows and pixel columns. Each image pixel in the array includes a photodiode that is coupled to a floating diffusion region via a transfer gate. Each pixel receives incident photons (light) and converts the photons into electrical signals. Column circuitry is coupled to each pixel column for reading out pixel signals from the image pixels. Image sensors are sometimes designed to provide images to electronic devices using a Joint Photographic Experts Group (JPEG) format.

Column circuitry in conventional image sensors sometimes includes a column amplifier and an analog-to-digital converter (ADC) coupled to a column output line. The column amplifier amplifies an analog signal from the column output line (which is coupled to a respective column of pixels). The analog-to-digital converter circuitry receives the amplified signal from the amplifier and converts the analog signal into a digital signal. The amplifier and ADC may not manipulate the signal from the column output line correctly. If care is not taken, an image sensor may suffer from performance issues due to errors associated with the column amplifier and ADC.

It would therefore be desirable to provide improved image sensors with capabilities for testing column circuitry.

BRIEF DESCRIPTION OF THE DRAWINGS

FIG. 6A is a graph of an illustrative rising ramped profile that may be used for a test voltage in accordance with an embodiment.

FIG. 6B is a graph of an illustrative falling ramped profile that may be used for a test voltage in accordance with an embodiment.

DETAILED DESCRIPTION

Figure 1:
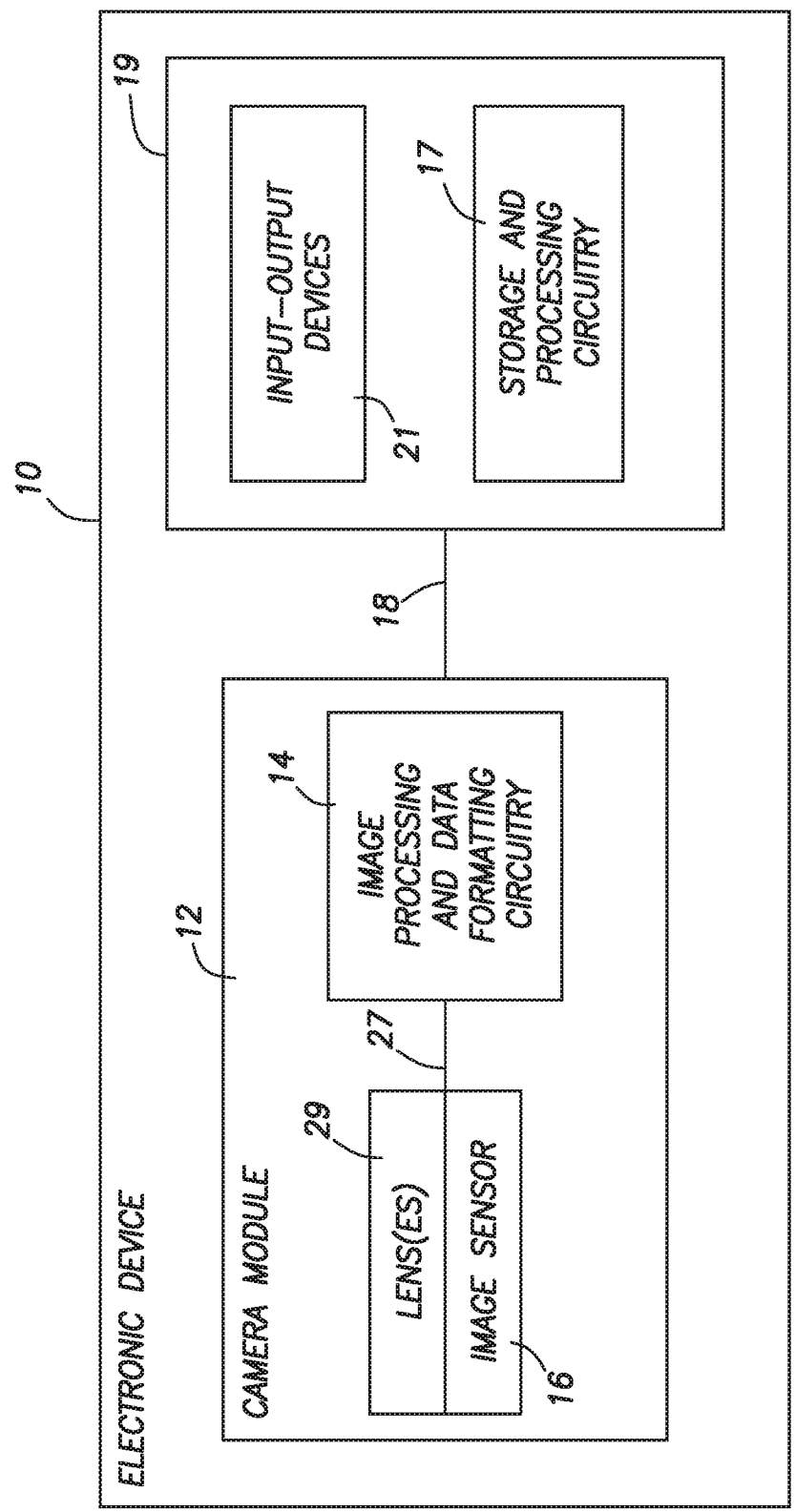
FIG. 1 is a schematic diagram of an illustrative electronic device that may include an image sensor in accordance with an embodiment.

Embodiments of the present invention relate to image sensors with testing circuitry for testing column circuitry components such as amplifiers and analog-to-digital converters. An electronic device with a digital camera module is shown in FIG. 1. Electronic device 10 may be a digital camera, a computer, a cellular telephone, a medical device, or other electronic device. Camera module 12 (sometimes referred to as an imaging device) may include image sensor 16 and one or more lenses 29. During operation, lenses 29 (sometimes referred to as optics 29) focus light onto image sensor 16. Image sensor 16 includes photosensitive elements (e.g., pixels) that convert the light into digital data. Image sensors may have any number of pixels (e.g., hundreds, thousands, millions, or more). A typical image sensor may, for example, have millions of pixels (e.g., megapixels). As examples, image sensor 16 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 16 may be provided to image processing and data formatting circuitry 14 via path 27. Image processing and data formatting circuitry 14 may be used to perform image processing functions such as automatic focusing functions, depth sensing, data formatting, adjusting white balance and exposure, implementing video image stabilization, face detection, etc. For example, during automatic focusing operations, image processing and data formatting circuitry 14 may process data gathered by phase detection pixels in image sensor 16 to determine the magnitude and direction of lens movement (e.g., movement of lens 29) needed to bring an object of interest into focus.

Image processing and data formatting circuitry 14 may also be used to compress raw camera image files if desired (e.g., to Joint Photographic Experts Group or JPEG format). In a typical arrangement, which is sometimes referred to as a system on chip (SOC) arrangement, camera sensor 16 and image processing and data formatting circuitry 14 are implemented on a common integrated circuit. The use of a single integrated circuit to implement camera sensor 16 and image processing and data formatting circuitry 14 can help to reduce costs. This is, however, merely illustrative. If desired, camera sensor 14 and image processing and data formatting circuitry 14 may be implemented using separate integrated circuits. If desired, camera sensor 16 and image processing circuitry 14 may be formed on separate semiconductor substrates. For example, camera sensor 16 and image processing circuitry 14 may be formed on separate substrates that have been stacked.

Camera module 12 may convey acquired image data to host subsystems 19 over path 18 (e.g., image processing and data formatting circuitry 14 may convey image data to subsystems 19). Electronic device 10 typically provides a user with numerous high-level functions. In a computer or advanced cellular telephone, for example, a user may be provided with the ability to run user applications. To implement these functions, host subsystem 19 of electronic device 10 may include storage and processing circuitry 17 and input-output devices 21 such as keypads, input-output ports, joysticks, and displays. Storage and processing circuitry 17 may include volatile and nonvolatile memory (e.g., random-access memory, flash memory, hard drives, solid state drives, etc.). Storage and processing circuitry 17 may also include microprocessors, microcontrollers, digital signal processors, application specific integrated circuits, or other processing circuits.

Figure 2:
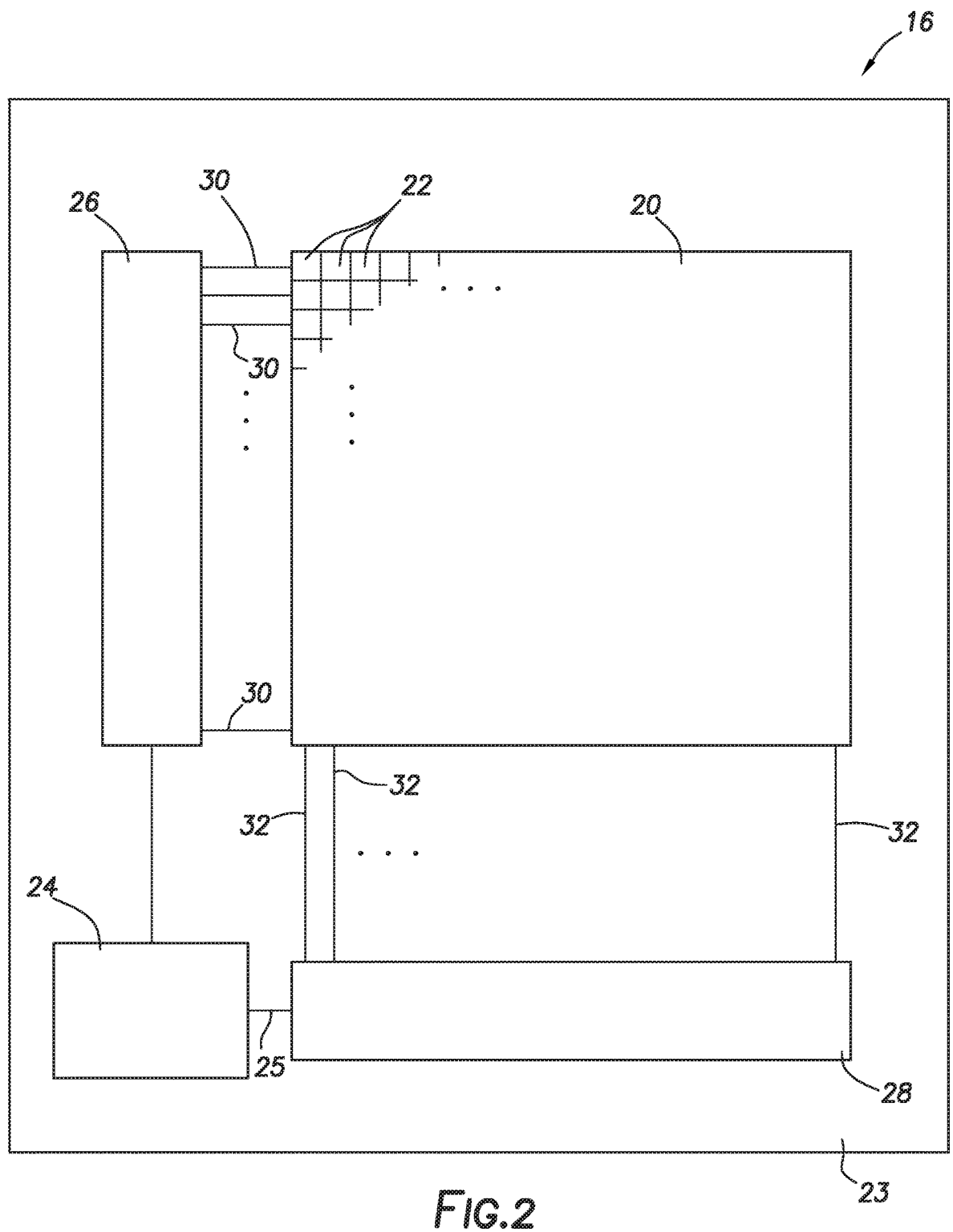
FIG. 2 is a diagram of an illustrative pixel array and associated readout circuitry for reading out image signals from the pixel array in accordance with an embodiment.

As shown in FIG. 2, image sensor 16 may include pixel array 20 containing image sensor pixels 22 arranged in rows and columns (sometimes referred to herein as image pixels or pixels) and control and processing circuitry 24 (which may include, for example, image signal processing circuitry). Image sensor pixels 22 may be complementary metal-oxide-semiconductor (CMOS) image sensor pixels or may be charge coupled device (CCD) image sensor pixels. Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, or column decoder circuitry). Pixel array 20, control and processing circuitry 24, row control circuitry 26, and image readout circuitry 28 may be formed on a substrate 23. If desired, some or all of the components of image sensor 16 may instead be formed on substrates other than substrate 23, which may be connected to substrate 23, for instance, through wire bonding or flip-chip bonding.

Row control circuitry 26 may receive row addresses from control circuitry 24 and supply corresponding row control signals such as reset, row-select, charge transfer, dual conversion gain, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, testing circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 over path 25 for pixels in one or more pixel columns.

Figure 3:
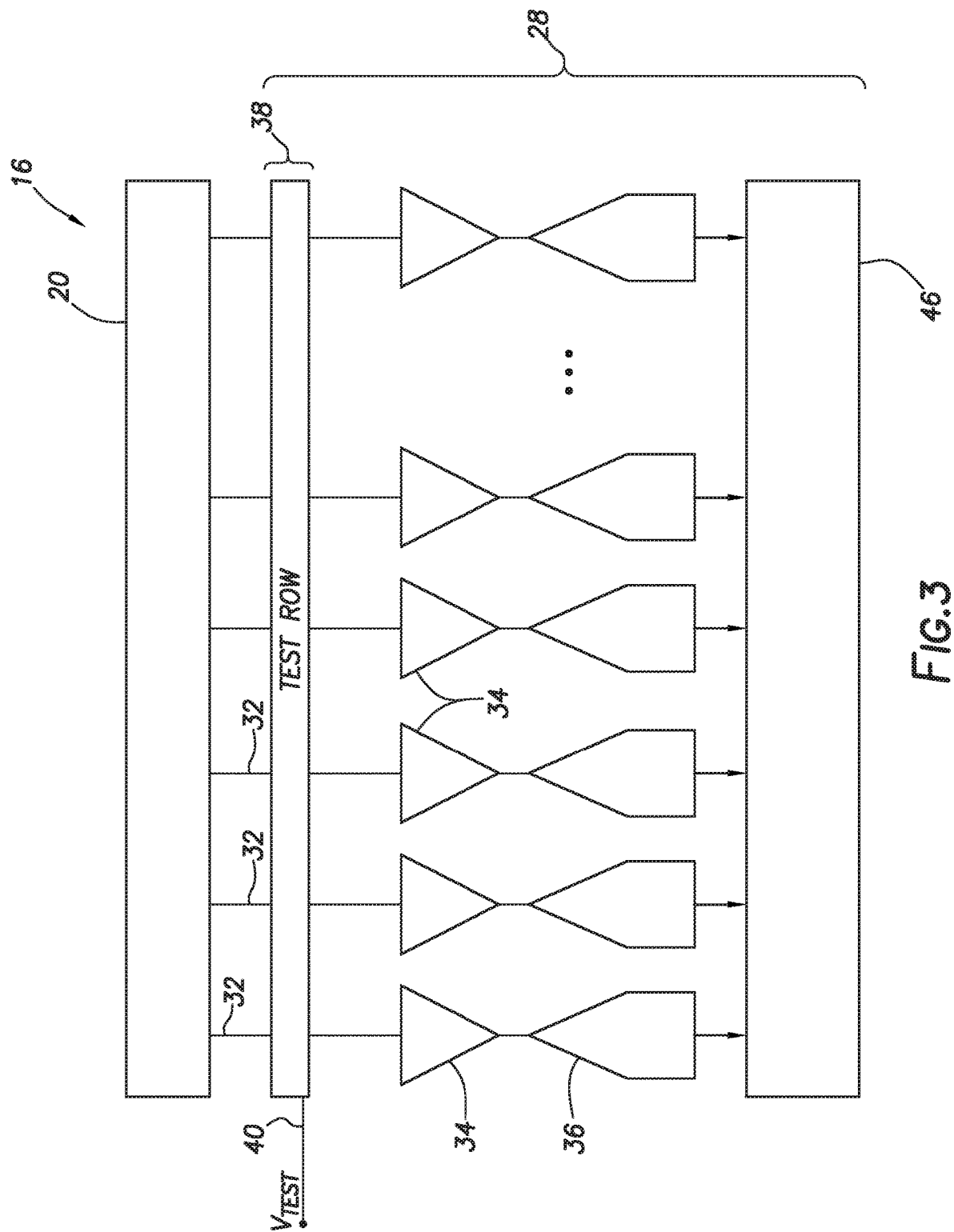
FIG. 3 is a diagram of an illustrative image sensor that includes a test row for providing a test voltage to the readout circuitry in accordance with an embodiment.

An image sensor with testing circuitry is shown in FIG. 3. As shown in FIG. 3, image readout circuitry 28 may include column amplifiers 34 (sometimes referred to as amplifier circuitry) and analog-to-digital converters 36 (sometimes referred to as analog-to-digital converter circuitry). In this example, each column of pixels in the array may have an associated column amplifier 34 and analog-to-digital converter 36. The column amplifier 34 may amplify a received signal. The analog-to-digital converter 36 may receive a signal from amplifier 34 and output the digital signal into column memory 46. Amplifiers 34 may optionally be omitted from the readout circuitry if desired.

Circuitry 28 may also include testing circuitry 38. The testing circuitry 38 may be configured to test other components within readout circuitry 28 such as column amplifiers 34 and analog-to-digital converters 36. As shown in FIG. 3, the testing circuitry may sometimes be referred to as a test row. The test row may receive a test voltage $V_{TEST}$ over test voltage signal line 40. When testing readout circuitry components such as amplifiers 34 and analog-to-digital converters, the test voltage $V_{TEST}$ may be provided to the amplifiers 34 and analog-to-digital converters 36.

For example, test row 38 may include switching circuitry that is configured to couple either the test voltage $V_{TEST}$ or the column output lines 32 to the column amplifier inputs. During normal operation (when image data is being captured by the image sensor), the column output lines may be coupled to the column amplifier inputs (e.g., each column output line 32 is coupled to a respective column amplifier 34). During testing operations, however, the column output lines may be bypassed and column amplifiers 34 are instead coupled to test voltage signal line 40 that provides a test voltage $V_{TEST}$. The column circuitry components such as amplifiers 34 and analog-to-digital converters 36 may then be tested using the test voltage $V_{TEST}$.

To test analog-to-digital converters 36, the amplifiers 34 may be set to an amplifier gain of 1. In other words, the amplifiers may be set to pass the voltage $V_{TEST}$ without any amplification. The analog-to-digital converters may then convert the voltage $V_{TEST}$ to a digital value (that is stored in column memory 46). The produced digital values in column memory 46 may be compared to the expected digital values for a corresponding $V_{TEST}$ value to determine whether or not the analog-to-digital converters are functioning properly. To test the analog-to-digital converters 36 at a range of different voltages, $V_{TEST}$ may be ramped between different voltages. For example, $V_{TEST}$ may start at a minimum voltage and slowly increase over time until a maximum voltage is reached. Alternatively, $V_{TEST}$ may start at a maximum voltage and slowly decrease over time until a minimum voltage is reached. The analog-to-digital converters 36 may be tested while $V_{TEST}$ is at different values. The amplifiers 34 may also be tested while at various gain settings. For example, the amplifier may be turned to any desired gain setting and $V_{TEST}$ may be tested at different voltages to verify performance of the amplifier (by comparing expected results for the $V_{TEST}$ levels used to the actual results obtained).

Figure 4:
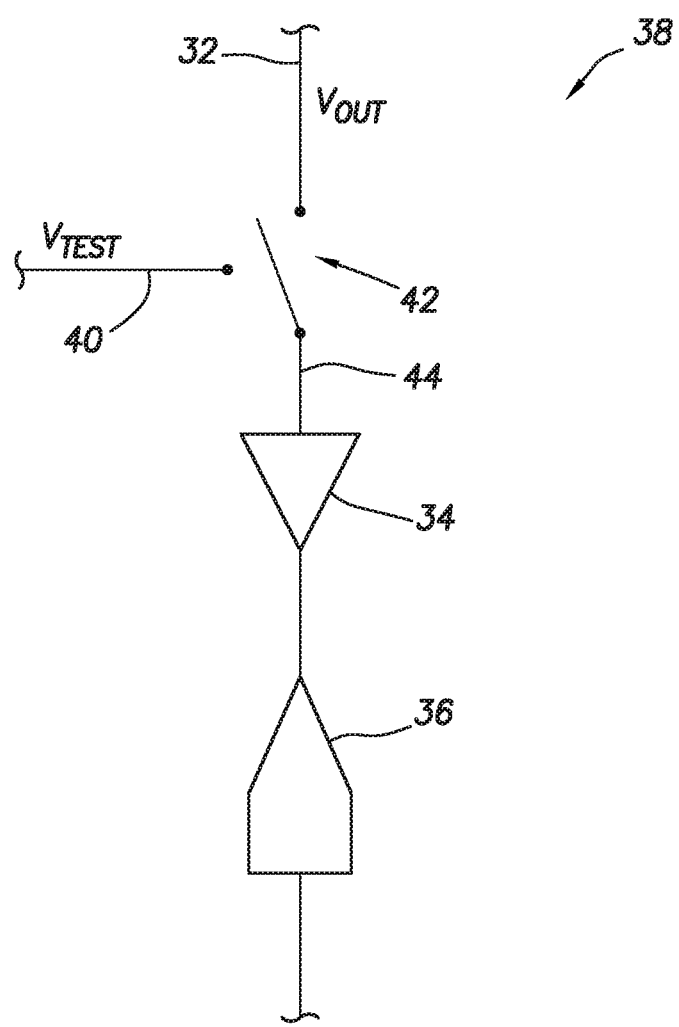
FIG. 4 is a diagram of illustrative switching circuitry that may be used to provide either the test voltage or the output voltage from a column output line to a readout circuitry component in accordance with an embodiment.

Any desired switching circuitry may be used to selectively couple either the test voltage or the output voltage from the column output line to the column amplifier in a given column. FIG. 4 is a schematic diagram of illustrative testing circuitry 38 that includes switching circuitry 42 for selecting the signal that is coupled to column amplifier input 44. In FIG. 4, switching circuitry 42 includes a switch that is coupled to input 44 of column amplifier 34. The switching circuitry 42 may couple the amplifier input to either test voltage signal line 40 to receive test voltage $V_{TEST}$ or column output line 32 to receive a pixel output voltage $V_{OUT}$. In other words, when switching circuitry 42 is in a first state, input 44 is coupled to test voltage signal line 40 and receives test voltage $V_{TEST}$. When switching circuitry 42 is in a second state that is different than the first state, input 44 is coupled to column output line 32 and receives pixel output voltage $V_{OUT}$. Switching circuitry 42 may be placed in the first state during testing operations (e.g., a testing mode). Switching circuitry 42 may be placed in the second state during imaging operations (e.g., an imaging mode).

The example of FIG. 4 of a single switch being used to provide $V_{TEST}$ to amplifier 34 is merely illustrative. In general, any desired components may be used to selectively couple the test voltage to the input of the column amplifier. For example, switching circuitry 42 may include one or more switches, one or more transistors, etc.

In FIG. 3, the same test voltage $V_{TEST}$ is provided to the entire test row. In other words, test voltage signal line 40 extends across the entire image sensor. Therefore, each column amplifier receives the same test voltage $V_{TEST}$ during testing.

When using a single test voltage for all of the columns of column readout circuitry in the sensor, certain test cases may not be sufficiently captured. For example, during normal operation of the image sensor different input voltages may be provided to the column readout circuitry at the same time. The difference in input voltages for components in adjacent columns may cause coupling between the components. However, in the arrangement of FIG. 3 the input voltages of adjacent components are the same (e.g., both $V_{TEST}$). Therefore, scenarios with coupling due to varying input voltages in adjacent components are not tested.

Figure 5:
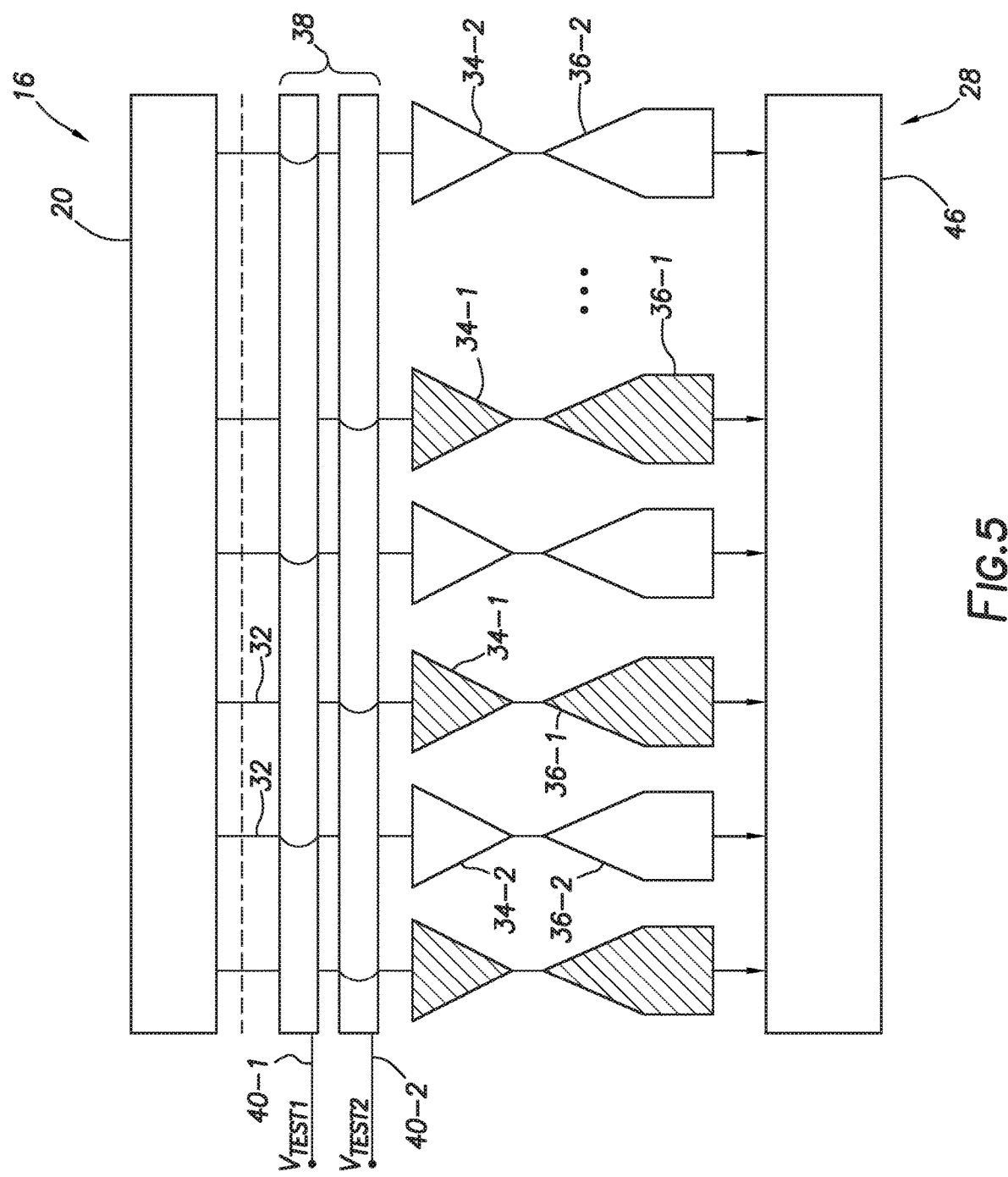
FIG. 5 is a diagram of an illustrative image sensor that includes two test rows for providing test voltages to readout circuitry in an alternating pattern in accordance with an embodiment.

To improve testing of the column readout circuitry, an arrangement of the type shown in FIG. 5 may be used. As shown in FIG. 5, similar to as in FIG. 3 the illustrative image readout circuitry 28 may include column amplifiers 34 (sometimes referred to as amplifier circuitry) and analog-to-digital converters 36 (sometimes referred to as analog-to-digital convert circuitry). In this example, each column of pixels in the array may have an associated column amplifier 34 and analog-to-digital converter 36. The column amplifier 34 may amplify a received signal. The analog-to-digital converter 36 may receive a signal from amplifier 34 and output the digital signal into column memory 46.

Circuitry 28 may also include testing circuitry 38. The testing circuitry 38 may be configured to test other components within readout circuitry 28 such as column amplifiers 34 and analog-to-digital converters 36. As shown in FIG. 5, the testing circuitry may include first and second test rows (instead of a single test row as in FIG. 3). The first test row may receive a first test voltage $V_{TEST1}$ over test voltage signal line 40-1. The second test row may receive a second test voltage $V_{TEST2}$ over test voltage signal line 40-2.

Half of the column amplifiers within the image sensor (e.g., column amplifiers 34-1) and half of the analog-to-digital converters within the image sensor (e.g., analog-to-digital converters 36-1) may be coupled to the first test row. The other half of column amplifiers (e.g., column amplifiers 34-2) and the other half of the analog-to-digital converters (e.g., analog-to-digital converters 36-2) may be coupled to the second test row. When testing readout circuitry components, the first test voltage $V_{TEST1}$ may be provided to the amplifiers 34-1 and analog-to-digital converters 36-1 whereas the second test voltage $V_{TEST2}$ may be provided to the amplifiers 34-2 and analog-to-digital converters 36-2.

For example, the first test row may include switching circuitry that is configured to couple either the test voltage $V_{TEST1}$ or the column output lines 32 to the column amplifier inputs of column amplifiers 34-1. During normal operation (when image data is being captured by the image sensor), the column output lines may be coupled to the column amplifier inputs of column amplifiers 34-1. During testing operations, however, the column output lines may be bypassed and column amplifiers 34-1 are instead coupled to test voltage signal line 40-1 that provides a test voltage $V_{TEST1}$. The column circuitry components such as amplifiers 34-1 and analog-to-digital converters 36-1 may then be tested using the test voltage $V_{TEST1}$ (e.g., using similar test procedures as discussed previously).

The second test row may include switching circuitry that is configured to couple either the test voltage $V_{TEST2}$ or the column output lines 32 to the column amplifier inputs of column amplifiers 34-2. During normal operation (when image data is being captured by the image sensor), the column output lines may be coupled to the column amplifier inputs of column amplifiers 34-2. During testing operations, however, the column output lines may be bypassed and column amplifiers 34-2 are instead coupled to test voltage signal line 40-2 that provides a test voltage $V_{TEST2}$. The column circuitry components such as amplifiers 34-2 and analog-to-digital converters 36-2 may then be tested using the test voltage $V_{TEST2}$ (e.g., using similar test procedures as discussed previously).

As shown in FIG. 5, the readout circuit components that receive $V_{TEST1}$ may alternate with the readout circuit components that receive $V_{TEST2}$. In other words, every other column of readout circuitry is coupled to test row 1 and every other column of readout circuitry is coupled to test row 2. The test voltages $V_{TEST1}$ and $V_{TEST2}$ may be different to test scenarios with coupling between different voltages on adjacent components.

FIGS. 6A and 6B are graphs showing different examples for ramped voltages that may be used as test voltages $V_{TEST1}$ and $V_{TEST2}$ in FIG. 5. As shown in FIG. 6A, the test voltage may be ramped up over time. At time $t_1$ the test voltage may have a corresponding voltage $V_2$. The test voltage may be ramped up over time such that at a later time $t_2$ the test voltage may have a corresponding voltage $V_1$ that is higher than $V_2$. FIG. 6A illustrates a test voltage that is ramped up (sometimes referred to as a rising ramp voltage, a rising ramp signal, etc.).

As shown in FIG. 6B, the test voltage may be ramped down over time. At time $t_1$ the test voltage may have a corresponding voltage $V_1$. The test voltage may be ramped down over time such that at a later time $t_2$ the test voltage may have a corresponding voltage $V_2$ that is lower than $V_1$. FIG. 6B illustrates a test voltage that is ramped down (sometimes referred to as a falling ramp voltage, a falling ramp signal, etc.).

To ensure a difference in input voltage to the amplifiers and ADCs of FIG. 5, $V_{TEST1}$ may be a rising ramp voltage whereas $V_{TEST2}$ may be a falling ramp voltage. For example, $V_{TEST1}$ may follow the profile shown in FIG. 6A whereas $V_{TEST2}$ may follow the profile shown in FIG. 6B. The falling ramp voltage may be described as the opposite of the rising ramp voltage. Using two opposing ramp voltages as test voltages $V_{TEST1}$ and $V_{TEST2}$ results in different voltages being provided to neighboring amplifiers and ADCs during testing, which allows for coupling to adjacent ADCs to be accounted for during testing. For example, at $t_1$ the first test voltage $V_{TEST1}$ (which follows the profile of FIG. 6A) has a voltage $V_2$ whereas the second test voltage $V_{TEST2}$ (which follows the profile of FIG. 6B) has a voltage $V_1$ that is higher than $V_2$. The difference between $V_1$ and $V_2$ helps test for coupling between adjacent components. Again, at $t_2$ the first test voltage $V_{TEST1}$ (which follows the profile of FIG. 6A)

has a voltage $V_1$ whereas the second test voltage $V_{TEST2}$ (which follows the profile of FIG. 6B) has a voltage $V_2$ that is lower than $V_1$. The difference between $V_1$ and $V_2$ helps test for coupling between adjacent components.

The slopes (e.g., the absolute value of the slopes) of the ramped voltages for $V_{TEST1}$ and $V_{TEST2}$ may be the same or may be different. The endpoints of the ramped voltages for $V_{TEST1}$ and $V_{TEST2}$ may be the same or may be different. In one illustrative example (shown in FIGS. 6A and 6B), the slopes and endpoints of the opposing ramped voltages are the same. This example is merely illustrative however. In general, a test voltage following any desired ramp profile may be provided as test voltage $V_{TEST1}$ or $V_{TEST2}$.

As shown in FIGS. 3 and 5, each column of pixels within pixel array 20 may have a corresponding set of readout circuitry components (e.g., a corresponding amplifier and analog-to-digital converter). In FIGS. 3 and 5, the sets of readout components are positioned in a single row. In other words, each amplifier and analog-to-digital converter for a given column is adjacent to the amplifier and analog-to-digital converter for the column on either side of the given column. The amplifier and analog-to-digital converter for the first column are adjacent to the amplifier and analog-to-digital converter for the second column, which are adjacent to the amplifier and analog-to-digital converter for the third column, etc. These examples are merely illustrative, however.

Figure 7:
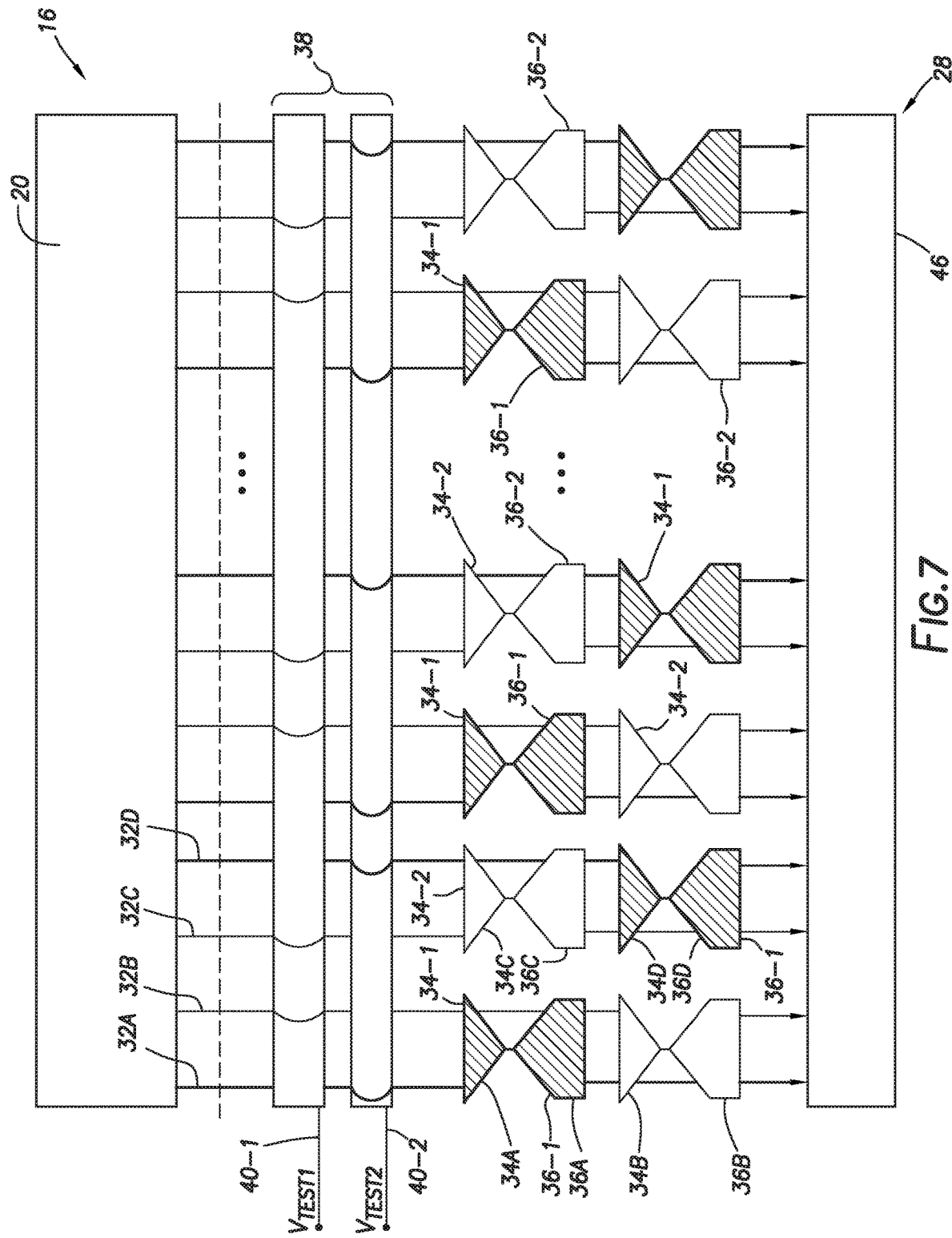
FIG. 7 is a diagram of an illustrative image sensor that includes two test rows for providing test voltages to stacked readout circuitry in a checkerboard pattern in accordance with an embodiment.

In some cases (such as when the pixels in pixel array 20 are small in size), two or more sets of readout circuitry components may be stacked. An example of this type is shown in FIG. 7. As shown in FIG. 7, a first amplifier 34A is coupled to a first column output line 32A. Amplifier 34A is coupled to a corresponding analog-to-digital converter 36A. The output of analog-to-digital converter 36A is provided to column memory 46. A second amplifier 34B is coupled to a second column output line 32B. Amplifier 34B is coupled to a corresponding analog-to-digital converter 36B. The output of analog-to-digital converter 36B is provided to column memory 46. A third amplifier 34C is coupled to a third column output line 32C. Amplifier 34C is coupled to a corresponding analog-to-digital converter 36C. The output of analog-to-digital converter 36C is provided to column memory 46. A fourth amplifier 34D is coupled to a fourth column output line 32D. Amplifier 34D is coupled to a corresponding analog-to-digital converter 36D. The output of analog-to-digital converter 36D is provided to column memory 46.

As shown in FIG. 7, the set of readout circuitry components associated with column output line 32A (e.g., amplifier 34A and ADC 36A) are stacked with the set of readout circuitry components associated with column line 32B. In other words, even though column output lines 32A and 32B are horizontally adjacent, components 34B/36B are vertically adjacent with components 34A/36A. This may allow for each column output line to be coupled to a respective set of readout circuit components even when the column output lines are tightly spaced (due to the pixels having a small size).

As in FIG. 5, testing circuitry may be included in the image sensor of FIG. 7 to enable testing of the readout circuitry components. The testing circuitry 38 may be configured to test column amplifiers 34 and analog-to-digital converters 36. The testing circuitry may include first and second test rows (similar to as in FIG. 5). The first test row may receive a first test voltage $V_{TEST1}$ over test voltage signal line 40-1. The second test row may receive a second test voltage $V_{TEST2}$ over test voltage signal line 40-2.

Half of the column amplifiers within the image sensor (e.g., column amplifiers 34-1) and half of the analog-to-digital converters within the image sensor (e.g., analog-to-digital converters 36-1) may be coupled to the first test row. The other half of column amplifiers (e.g., column amplifiers 34-2) and the other half of the analog-to-digital converters (e.g., analog-to-digital converters 36-2) may be coupled to the second test row. When testing readout circuitry components, the first test voltage $V_{TEST1}$ may be provided to the amplifiers 34-1 and analog-to-digital converters 36-1 whereas the second test voltage $V_{TEST2}$ may be provided to the amplifiers 34-2 and analog-to-digital converters 36-2.

For example, the first test row may include switching circuitry that is configured to couple either the test voltage $V_{TEST1}$ or the column output lines 32 to the column amplifier inputs of column amplifiers 34-1. During normal operation (when image data is being captured by the image sensor), the column output lines may be coupled to the column amplifier inputs of column amplifiers 34-1. During testing operations, however, the column output lines may be bypassed and column amplifiers 34-1 are instead coupled to test voltage signal line 40-1 that provides a test voltage $V_{TEST1}$. The column circuitry components such as amplifiers 34-1 and analog-to-digital converters 36-1 may then be tested using the test voltage $V_{TEST1}$ (e.g., using similar test procedures as discussed previously).

The second test row may include switching circuitry that is configured to couple either the test voltage $V_{TEST2}$ or the column output lines 32 to the column amplifier inputs of column amplifiers 34-2. During normal operation (when image data is being captured by the image sensor), the column output lines may be coupled to the column amplifier inputs of column amplifiers 34-2. During testing operations, however, the column output lines may be bypassed and column amplifiers 34-2 are instead coupled to test voltage signal line 40-2 that provides a test voltage $V_{TEST2}$. The column circuitry components such as amplifiers 34-2 and analog-to-digital converters 36-2 may then be tested using the test voltage $V_{TEST2}$ (e.g., using similar test procedures as discussed previously).

As shown in FIG. 7, the readout circuit components that receive $V_{TEST1}$ may alternate with the readout circuit components that receive $V_{TEST2}$ in a checkerboard pattern. For example, column output line 32A and column output line 32D may both be coupled to test row 1, whereas column output line 32B and column output line 32C may both be coupled to test row 2. Consequently, amplifier 34A, analog-to-digital converter 36A, amplifier 34D, and analog-to-digital converter 36D will all receive $V_{TEST1}$ during testing operations. Amplifier 34B, analog-to-digital converter 36B, amplifier 34C, and analog-to-digital converter 36C will all receive $V_{TEST2}$ during testing operations. With this type of arrangement, amplifiers and analog-to-digital converters that are horizontally adjacent (e.g., amplifier 34A and amplifier 34B or analog-to-digital converter 36A and analog-to-digital converter 36B) will receive different input voltages. Similarly, amplifiers and analog-to-digital converters that are vertically adjacent (e.g., amplifier 34A and amplifier 34C or analog-to-digital converter 36A and analog-to-digital converter 36C) will receive different input voltages. Thus, the distance between amplifiers and analog-to-digital converters that receive the same input voltage (e.g., amplifier 34A and amplifier 34D or analog-to-digital converter 36A and analog-to-digital converter 36D) is maximized. Providing different test voltages to adjacent readout circuitry components enables testing of scenarios with coupling between different voltages on adjacent components.

To ensure a difference in input voltage to the amplifiers and ADCs of FIG. 7, $V_{TEST1}$ may be a rising ramp voltage whereas $V_{TEST2}$ may be a falling ramp voltage. For example, $V_{TEST1}$ may follow the profile shown in FIG. 6A whereas $V_{TEST2}$ may follow the profile shown in FIG. 6B. Using two opposing ramp voltages as test voltages $V_{TEST1}$ and $V_{TEST2}$ results in different voltages being provided to neighboring amplifiers and ADCs during testing, which allows for coupling to adjacent ADCs to be accounted for during testing.

Figure 8:
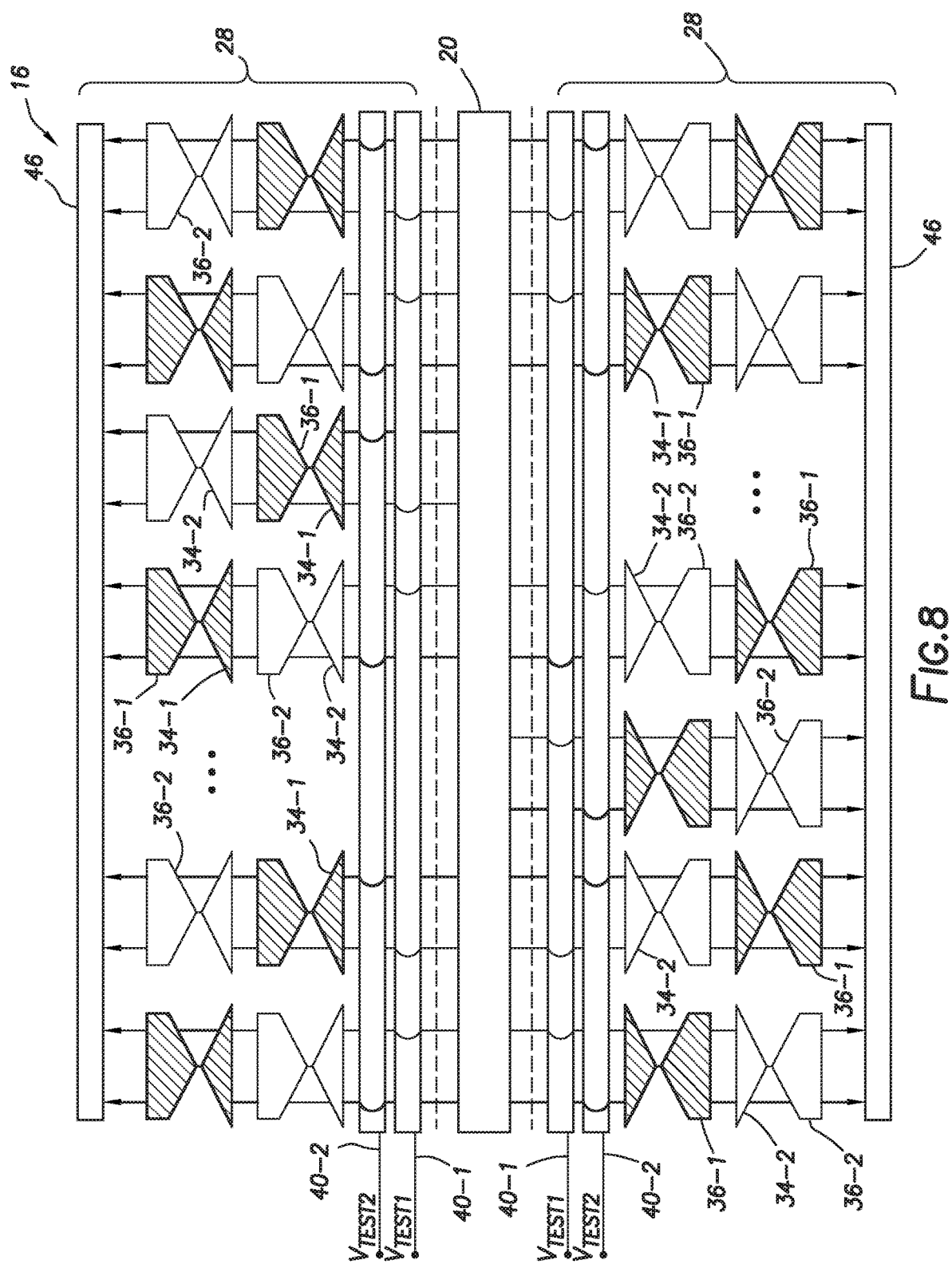
FIG. 8 is a diagram of an illustrative image sensor that includes two test rows on opposing sides of imaging pixels for providing test voltages to stacked readout circuitry in a checkerboard pattern in accordance with an embodiment.

In FIGS. 3, 5, and 7, readout circuitry 28 is depicted as being formed on only one side of the array. In these types of embodiments, the readout circuitry may be used to read out pixel information from all of the rows in the pixel array. However, in other embodiments, as shown in FIG. 8, readout circuitry may be provided on multiple sides of the pixel array. In FIG. 8, readout circuitry is provided on two opposing sides of pixel array 20. In this arrangement, the readout circuitry above the pixel array may be used to readout pixel information from half of the pixels in the pixel array (e.g., the first half of rows in the pixel array). The readout circuitry below the pixel array may be used to readout pixel information from the other half of the pixels in the pixel array (e.g., the second half of rows in the pixel array). This may increase the readout speed for the image sensor, for example.

When readout circuitry is formed on two sides of the pixel array, both sets of readout circuitry may include testing circuitry. For example, in FIG. 8, the readout circuitry below the pixel array is the same as shown and discussed in connection with FIG. 7. The readout circuitry above the pixel array is the same as the readout circuitry below the pixel array. Both sets of readout circuitry are coupled to the test rows such that the test voltage is distributed in a checkerboard pattern across the sets of readout circuit components.

In FIG. 8, the same test voltage $V_{TEST1}$ is provided to the first test row below the pixel array and the first test row above the pixel array and the same test voltage $V_{TEST2}$ is provided to the second test row below the pixel array and the second test row above the pixel array. This example is merely illustrative however. If desired, different test voltages may be provided to each test row (e.g., four different test voltages may be used, one for each test row). In general, any desired test voltage having any desired ramp profile may be provided to each test row in the image sensor.

Figure 9:
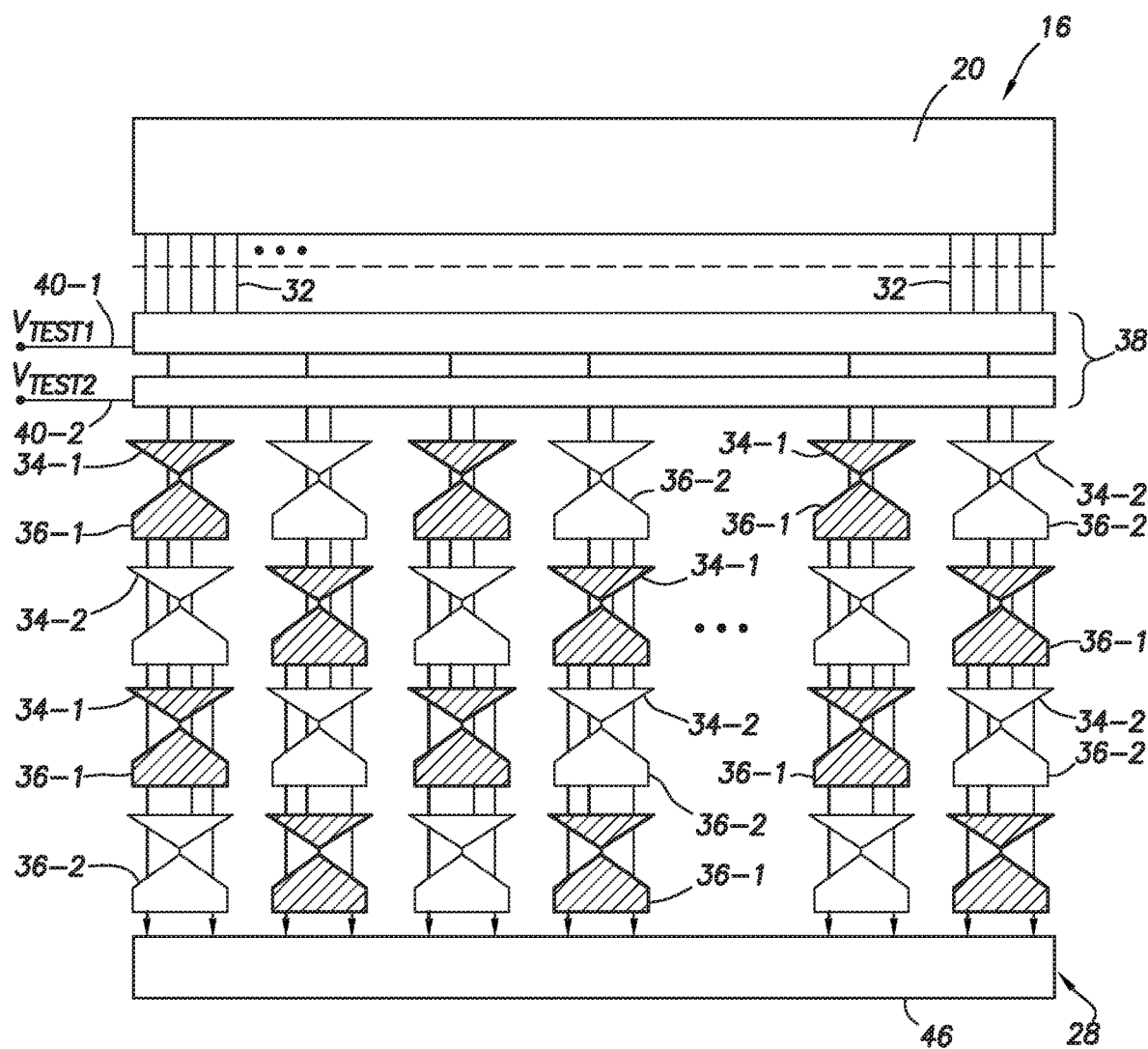
FIG. 9 is a diagram of an illustrative image sensor that includes two test rows for providing test voltages to columns of four stacked sets of readout circuitry in a checkerboard pattern in accordance with an embodiment.

FIG. 9 depicts an image sensor with more than two sets of readout circuitry components that are stacked in a column. As shown in FIG. 9, four sets of readout circuit components are stacked for a given group of four columns of imaging pixels. Each set of readout circuit components includes an amplifier and an analog-to-digital converter. Each analog-to-digital converter has a respective output that is provided to column memory 46. Each amplifier has an output that is coupled to a respective analog-to-digital converter. Each amplifier has an input that is coupled to either one of the test rows or a respective column output line. This arrangement may allow for each column output line to be coupled to a respective set of readout circuit components even when the column output lines are tightly spaced (due to the pixels having a small size).

As shown in FIG. 9, the readout circuit components that receive $V_{TEST1}$ may alternate with the readout circuit components that receive $V_{TEST2}$ in a checkerboard pattern. With this type of arrangement, amplifiers and analog-to-digital converters that are horizontally adjacent will receive different input voltages. Similarly, amplifiers and analog-to-digital converters that are vertically adjacent will receive different input voltages. Thus, the distance between amplifiers and analog-to-digital converters that receive the same input voltage is maximized. Providing different test voltages to adjacent readout circuitry components enables testing of scenarios with coupling between different voltages on adjacent components.

To ensure a difference in input voltage to the amplifiers and ADCs of FIG. 9, $V_{TEST1}$ may be a rising ramp voltage whereas $V_{TEST2}$ may be a falling ramp voltage. For example, $V_{TEST1}$ may follow the profile shown in FIG. 6A whereas $V_{TEST2}$ may follow the profile shown in FIG. 6B. Using two opposing ramp voltages as test voltages $V_{TEST1}$ and $V_{TEST2}$ results in different voltages being provided to neighboring amplifiers and ADCs during testing, which allows for coupling to adjacent ADCs to be accounted for during testing.

Figure 10:
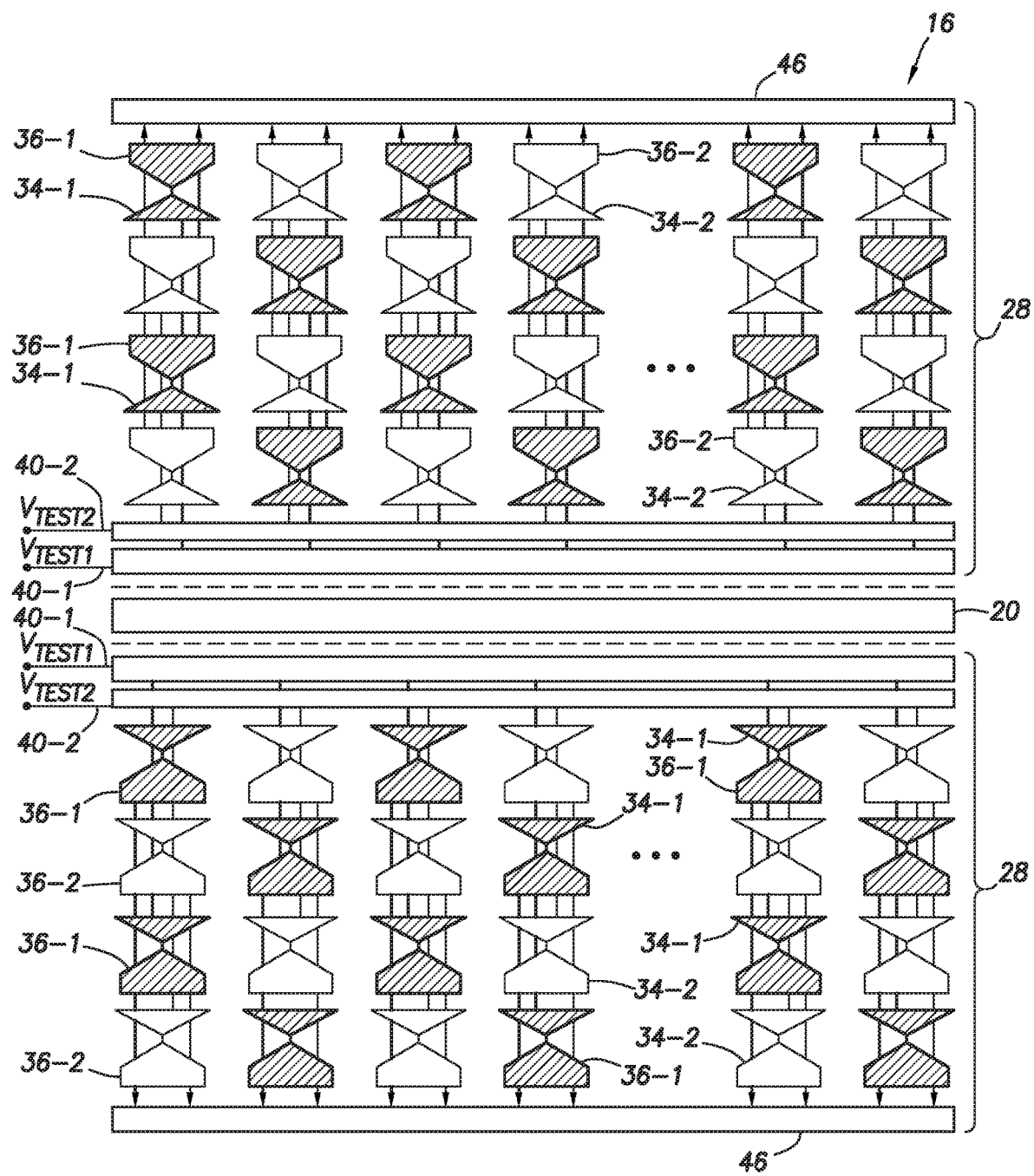
FIG. 10 is a diagram of an illustrative image sensor that includes two test rows on opposing sides of imaging pixels for providing test voltages to columns of four stacked sets of readout circuitry in a checkerboard pattern in accordance with an embodiment.

FIG. 10 shows an example similar to FIG. 9 with two-sided readout capabilities. In FIG. 10, the readout circuitry below the pixel array is the same as shown and discussed in connection with FIG. 9. The readout circuitry above the pixel array is the same as the readout circuitry below the pixel array. Both sets of readout circuitry are coupled to the test rows such that the test voltage is distributed in a checkerboard pattern across the sets of readout circuit components. In FIG. 10, the same test voltage $V_{TEST1}$ is provided to the first test row below the pixel array and the first test row above the pixel array and the same test voltage $V_{TEST2}$ is provided to the second test row below the pixel array and the second test row above the pixel array. This example is merely illustrative however. If desired, different test voltages may be provided to each test row (e.g., four different test voltages may be used, one for each test row). In general, any desired test voltage having any desired ramp profile may be provided to each test row in the image sensor.

In FIGS. 3, 5, and 7-10, image sensors have been depicted with examples of arrangements for test rows. In each of these embodiments, two test rows are shown on any side of the image sensor with readout circuitry, with the two test rows providing two different test voltages to the readout circuitry in an alternating or checkerboard pattern. However, this example is merely illustrative. In general, any desired number of test rows may be provided on either side of the image sensor (e.g., two test rows, three test rows, four test rows, more than four test rows, etc.). Each test row may receive any desired test voltage having any desired profile over time. For example, each given test voltage may rise over time, fall over time, remain constant, or a combination of one or more of these. Each test voltage may be provided to any desired readout circuit components during testing operations. The example of two test voltages being coupled to the readout circuit components in an alternating or checkerboard fashion is merely illustrative. Other patterns may be used if desired. In arrangements with two-sided readout, the readout circuitry on opposing sides of the image sensor may be the same or may be different.

The foregoing is merely illustrative of the principles of this invention and various modifications can be made by those skilled in the art without departing from the scope and spirit of the invention.

What is claimed is:

1. An image sensor comprising:
    an array of imaging pixels;
    readout circuitry configured to read out signals from the array of imaging pixels;
    a first test row that is configured to provide a first test voltage to the readout circuitry; and
    a second test row that is configured to provide a second test voltage that is different than the first test voltage to the readout circuitry, wherein the readout circuitry comprises a first plurality of amplifiers and analog-to-digital converters and a second plurality of amplifiers and analog-to-digital converters, wherein the first plurality of amplifiers and analog-to-digital converters is configured to receive the first test voltage, and wherein the second plurality of amplifiers and analog-to-digital converters is configured to receive the second test voltage.

2. The image sensor defined in claim 1, wherein the first test row comprises a first test voltage input line that provides the first test voltage and the second test row comprises a second test voltage input line that provides the second test voltage.

3. The image sensor defined in claim 1, wherein the first plurality of amplifiers and analog-to-digital converters and the second plurality of amplifiers and analog-to-digital converters are arranged in an alternating pattern.

4. The image sensor defined in claim 1, wherein the first plurality of amplifiers and analog-to-digital converters and the second plurality of amplifiers and analog-to-digital converters are arranged in a checkerboard pattern.

5. The image sensor defined in claim 1, wherein an amplifier of the first plurality of amplifiers and analog-to-digital converters is interposed between first and second amplifiers of the second plurality of amplifiers and analog-to-digital converters.

6. The image sensor defined in claim 1, further comprising:
a plurality of column output lines coupled to the array of imaging pixels.

7. The image sensor defined in claim 6, wherein the first plurality of amplifiers and analog-to-digital converters is configured to receive the first test voltage in a first mode, wherein the second plurality of amplifiers and analog-to-digital converters is configured to receive the second test voltage in the first mode, wherein the first plurality of amplifiers and analog-to-digital converters is configured to receive signals from a first subset of the plurality of column output lines in a second mode, and wherein the second plurality of amplifiers and analog-to-digital converters is configured to receive signals from a second subset of the plurality of column output lines in the second mode.

8. The image sensor defined in claim 7, wherein the first test voltage is configured to follow a first ramped profile during the first mode and wherein the second test voltage is configured to follow a second ramped profile that is different than the first ramped profile during the first mode.

9. The image sensor defined in claim 7, wherein the first test voltage is configured to follow a rising ramped profile during the first mode and wherein the second test voltage is configured to follow a falling ramped profile during the first mode.

10. The image sensor defined in claim 1, wherein the first and second test rows are interposed between the array of imaging pixels and the readout circuitry.

11. The image sensor defined in claim 10, wherein the readout circuitry is formed on a first side of the array of imaging pixels and wherein the image sensor further comprises:

additional readout circuitry formed on a second, opposing side of the array of imaging pixels;
a third test row that is configured to provide a third test voltage to the additional readout circuitry; and
a fourth test row that is configured to provide a fourth test voltage that is different than the third test voltage to the additional readout circuitry, wherein the third and fourth test rows are interposed between the array of imaging pixels and the additional readout circuitry.

12. The image sensor defined in claim 11, wherein the third test voltage is the same as the first test voltage and the fourth test voltage is the same as the second test voltage.

13. An image sensor comprising:
an array of imaging pixels;
a plurality of column output lines coupled to the array of imaging pixels;
readout circuitry having a first plurality of components and a second plurality of components;
a first test row comprising switching circuitry that provides a first test voltage to the first plurality of components in a first state and that provides signals from the plurality of column output lines to the first plurality of components in a second state; and
a second test row comprising switching circuitry that provides a second test voltage to the second plurality of components in the first state and that provides signals from the plurality of column output lines to the second plurality of components in a second state.

14. The image sensor defined in claim 13, wherein the first plurality of components alternate with the second plurality of components.

15. The image sensor defined in claim 13, wherein the first plurality of components and the second plurality of components are arranged in a checkerboard pattern.

16. The image sensor defined in claim 13, wherein the first test voltage and the second test voltage have opposing ramped profiles.

17. The image sensor defined in claim 16, wherein a first absolute value of a first slope of a first ramped profile of the first test voltage is the same as a second absolute value of a second slope of a second ramped profile of the second test voltage.

18. An image sensor comprising:
an array of imaging pixels;
readout circuitry; and
circuitry configured to provide at least first and second test voltages to the readout circuitry in a first mode and to provide signals from the array of imaging pixels to the readout circuitry in a second mode, wherein the first test voltage is configured to follow a rising ramped profile during the first mode and wherein the second test voltage is configured to follow a falling ramped profile during the first mode.

19. The image sensor defined in claim 18, wherein the first mode is a testing mode and the second mode is an imaging mode.

* * * * *